United States Patent
Vartanian et al.

(10) Patent No.: US 10,496,170 B2
(45) Date of Patent: Dec. 3, 2019

(54) VEHICLE COMPUTING SYSTEM TO PROVIDE FEEDBACK

(71) Applicant: HJ Laboratories, LLC, Bryn Mawr, PA (US)

(72) Inventors: Harry Vartanian, Bryn Mawr, PA (US); Jaron Jurikson-Rhodes, Philadelphia, PA (US)

(73) Assignee: HJ Laboratories, LLC, Bryn Mawr, PA (US)

( * ) Notice: Subject to any disclaimer, the term of this patent is extended or adjusted under 35 U.S.C. 154(b) by 0 days.

(21) Appl. No.: 15/498,122

(22) Filed: Apr. 26, 2017

(65) Prior Publication Data

US 2017/0228023 A1 Aug. 10, 2017

Related U.S. Application Data (63) Continuation of application No. 12/706,205, filed on Feb. 16, 2010, now abandoned.

(51) Int. Cl.
*G06F 3/01* (2006.01)
*G06F 3/043* (2006.01)
(Continued)

(52) U.S. Cl.
CPC .............. *G06F 3/016* (2013.01); *G06F 3/043* (2013.01); *G06F 3/0416* (2013.01); *G06F 3/0488* (2013.01); *G06F 3/04845* (2013.01); *G06F 3/04886* (2013.01); *B60K 2370/11* (2019.05); *B60K 2370/113* (2019.05); *B60K 2370/1438* (2019.05); *G06F 2203/014* (2013.01); *G06F 2203/04102* (2013.01); *G06F 2203/04108* (2013.01); *G06F 2203/04809* (2013.01)

(58) Field of Classification Search
CPC .......... G06F 3/04886; G06F 2203/014; G06F 2203/04803; G06F 3/016; G06F 3/043; G06F 3/0416; G06F 3/0488; G06F 3/04845; G06F 2203/04809; G06F 2203/04108; G06F 2203/04102; B60K 2370/11; B60K 2370/113; B60K 2370/1438
See application file for complete search history.

(56) References Cited

U.S. PATENT DOCUMENTS 4,871,992 A 10/1989 Petersen
5,327,457 A 7/1994 Leopold
(Continued)

FOREIGN PATENT DOCUMENTS

EP 676781 B1 1/1999
GB 2382291 A 5/2003
(Continued)

OTHER PUBLICATIONS

Iwamoto et al., "A Tactile Display using Ultrasound Linear Phased Array", International Conference on Artificial Reality and Telexistence, 2004, Seoul, Korea.

(Continued)

*Primary Examiner* — Gene W Lee
(74) *Attorney, Agent, or Firm* — Volpe and Koenig, P.C.

(57) ABSTRACT

A vehicle computing system may provide feedback in a vehicle, using a vehicle processor of the vehicle. A touch display may display windows with different vibrations to provide the feedback. A vibration may vary in relation to data.

2 Claims, 7 Drawing Sheets

(51) Int. Cl.
*G06F 3/041* (2006.01)
*G06F 3/0488* (2013.01)
*G06F 3/0484* (2013.01)

(56) References Cited

U.S. PATENT DOCUMENTS

| | | | |
|---|---|---|---|
| 5,402,490 A | 3/1995 | Mihm, Jr. |
| 5,412,189 A | 5/1995 | Cragun |
| 5,463,657 A | 10/1995 | Rice |
| 5,490,087 A | 2/1996 | Redden et al. |
| 5,504,938 A | 4/1996 | Redden |
| 5,602,901 A | 2/1997 | Redden et al. |
| 5,673,256 A | 9/1997 | Maine |
| 5,712,870 A | 1/1998 | Petrick |
| 5,717,434 A | 2/1998 | Toda |
| 5,724,659 A | 3/1998 | Daniel et al. |
| 5,752,162 A | 5/1998 | Sawyer et al. |
| 5,825,308 A | 10/1998 | Rosenberg |
| 5,867,144 A | 2/1999 | Wyard |
| 5,867,789 A | 2/1999 | Olds et al. |
| 5,888,161 A | 3/1999 | McCarrick et al. |
| 5,892,902 A | 4/1999 | Clark |
| 6,004,049 A | 12/1999 | Knox |
| 6,037,882 A | 3/2000 | Levy |
| 6,075,967 A | 6/2000 | Naimark et al. |
| 6,104,922 A | 8/2000 | Baumann |
| 6,117,296 A | 9/2000 | Thomson |
| 6,131,032 A | 10/2000 | Patel |
| 6,140,913 A | 10/2000 | Okada et al. |
| 6,185,536 B1 | 2/2001 | Haber et al. |
| 6,204,896 B1 | 3/2001 | Matsuhira et al. |
| 6,243,078 B1 | 6/2001 | Rosenberg |
| 6,255,938 B1 | 7/2001 | Bornschein |
| 6,266,690 B1 | 7/2001 | Shankarappa et al. |
| 6,313,825 B1 | 11/2001 | Gilbert |
| 6,359,978 B1 | 3/2002 | Brady |
| 6,434,702 B1 | 8/2002 | Maddalozzo, Jr. et al. |
| 6,441,828 B1 | 8/2002 | Oba et al. |
| 6,456,245 B1 | 9/2002 | Crawford |
| 6,462,840 B1 | 10/2002 | Kravtsov |
| 6,487,657 B1 | 11/2002 | Brockmann |
| 6,492,979 B1 | 12/2002 | Kent et al. |
| 6,535,201 B1 | 3/2003 | Cooper et al. |
| 6,559,620 B2 | 5/2003 | Zhou et al. |
| 6,563,487 B2 | 5/2003 | Martin et al. |
| 6,571,102 B1 | 5/2003 | Hogberg et al. |
| 6,597,347 B1 | 7/2003 | Yasutake |
| 6,628,511 B2 | 9/2003 | Engstrom |
| 6,646,540 B1 | 11/2003 | Lussey |
| 6,680,731 B2 | 1/2004 | Gerpheide et al. |
| 6,700,553 B2 | 3/2004 | Becker et al. |
| 6,703,550 B2 | 3/2004 | Chu |
| 6,744,178 B2 | 6/2004 | Muramatsu et al. |
| 6,782,102 B2 | 8/2004 | Blanchard et al. |
| 6,787,238 B2 | 9/2004 | Zhang et al. |
| 6,823,787 B1 | 11/2004 | Saueressig |
| 6,842,428 B2 | 1/2005 | Chen et al. |
| 6,842,607 B2 | 1/2005 | Godfrey et al. |
| 6,852,416 B2 | 2/2005 | Zhang et al. |
| 6,859,569 B2 | 2/2005 | Ishibashi et al. |
| 6,859,572 B2 | 2/2005 | Ishibashi |
| 6,881,063 B2 | 4/2005 | Yang |
| 6,882,086 B2 | 4/2005 | Kornbluh et al. |
| 6,888,161 B2 | 5/2005 | Shih |
| 6,925,495 B2 | 8/2005 | Hegde et al. |
| 6,984,208 B2 | 1/2006 | Zheng |
| 6,988,247 B2 | 1/2006 | Janevski |
| 7,027,311 B2 | 4/2006 | Vanderelli et al. |
| 7,042,711 B2 | 5/2006 | Tanaka et al. |
| 7,042,997 B2 | 5/2006 | Jones |
| 7,050,835 B2 | 5/2006 | Hack et al. |
| 7,054,145 B2 | 5/2006 | Tanaka et al. |
| 7,077,015 B2 | 7/2006 | Hayward et al. |
| 7,102,621 B2 | 9/2006 | Roberts |
| 7,109,967 B2 | 9/2006 | Hioki et al. |
| 7,113,177 B2 | 9/2006 | Franzen |
| 7,138,985 B2 | 11/2006 | Nakajima |
| 7,151,527 B2 | 12/2006 | Culver |
| 7,184,032 B2 | 2/2007 | Stohrer et al. |
| 7,186,356 B2 | 3/2007 | Lussey et al. |
| 7,190,416 B2 | 3/2007 | Paukshto et al. |
| 7,193,350 B1 | 3/2007 | Blackburn et al. |
| 7,253,807 B2 | 8/2007 | Nakajima |
| 7,269,153 B1 | 9/2007 | Schultz et al. |
| 7,274,652 B1 | 9/2007 | Webster et al. |
| 7,301,435 B2 | 11/2007 | Lussey et al. |
| 7,317,872 B1 | 1/2008 | Posa et al. |
| 7,339,572 B2 | 3/2008 | Schena |
| 7,352,356 B2 | 4/2008 | Roberts et al. |
| 7,368,307 B2 | 5/2008 | Cok |
| 7,377,133 B2 | 5/2008 | Sandbach et al. |
| 7,382,357 B2 | 6/2008 | Panotopoulos et al. |
| 7,400,640 B2 | 7/2008 | Fischer et al. |
| 7,406,057 B2 | 7/2008 | Isomaki et al. |
| 7,408,872 B2 | 8/2008 | Palin et al. |
| 7,436,318 B2 | 10/2008 | Affolter et al. |
| 7,444,157 B2 | 10/2008 | Hovers et al. |
| 7,455,304 B2 | 11/2008 | Porter |
| 7,461,353 B2 | 12/2008 | Rohrabaugh et al. |
| 7,495,348 B2 | 2/2009 | Mund et al. |
| 7,500,952 B1 | 3/2009 | Chiang et al. |
| 7,511,702 B2 | 3/2009 | Hotelling |
| 7,522,153 B2 | 4/2009 | Ohtsuka |
| 7,548,232 B2 | 6/2009 | Shahoian et al. |
| 7,554,045 B2 | 6/2009 | Sandbach et al. |
| 7,554,051 B2 | 6/2009 | Crispin |
| 7,561,141 B2 | 7/2009 | Shahoian et al. |
| 7,567,243 B2 | 7/2009 | Hayward |
| 7,592,999 B2 | 9/2009 | Rosenberg et al. |
| 7,593,067 B2 | 9/2009 | Taguchi |
| 7,656,394 B2 | 2/2010 | Westerman et al. |
| 7,731,670 B2 | 6/2010 | Aguirre-Ollinger et al. |
| 7,756,297 B2 | 7/2010 | Pryor |
| 7,787,646 B2 | 8/2010 | Pelrine et al. |
| 7,828,733 B2 | 11/2010 | Zhang et al. |
| 7,841,944 B2 | 11/2010 | Wells |
| 7,843,449 B2 | 11/2010 | Krah |
| 7,893,928 B2 | 2/2011 | Im |
| 7,953,462 B2 | 5/2011 | Harry |
| 7,982,588 B2 | 7/2011 | Makinen et al. |
| 8,068,101 B2 | 11/2011 | Goertz |
| 8,095,879 B2 | 1/2012 | Goertz |
| 8,125,463 B2 | 2/2012 | Hotelling et al. |
| 8,136,402 B2 | 3/2012 | Cato |
| 8,169,416 B2 | 5/2012 | Han |
| 8,232,973 B2 | 7/2012 | Kocienda et al. |
| 8,255,323 B1 | 8/2012 | Casey et al. |
| 8,406,816 B2 | 3/2013 | Marui et al. |
| 8,433,138 B2 | 4/2013 | Wang et al. |
| 8,547,339 B2 | 10/2013 | Ciesla |
| 8,558,803 B2 | 10/2013 | Park et al. |
| 8,593,409 B1 | 11/2013 | Heubel |
| 8,619,051 B2 | 12/2013 | Lacroix et al. |
| 8,686,952 B2 | 4/2014 | Burrough et al. |
| 8,773,356 B2 | 7/2014 | Martin et al. |
| 8,825,113 B2 | 9/2014 | Kim et al. |
| 9,244,173 B1 | 1/2016 | Vartanian et al. |
| 9,250,734 B2 | 2/2016 | Hotelling et al. |
| 9,332,113 B2 | 5/2016 | Vartanian |
| 2001/0020202 A1* | 9/2001 | Obradovich ............ B60K 35/00 |
| | | 701/1 |
| 2002/0030699 A1 | 3/2002 | Van Ee |
| 2002/0050983 A1 | 5/2002 | Liu et al. |
| 2002/0158836 A1 | 10/2002 | Ishmael |
| 2003/0038776 A1 | 2/2003 | Rosenberg et al. |
| 2003/0048260 A1 | 3/2003 | Matusis |
| 2003/0058265 A1 | 3/2003 | Robinson et al. |
| 2004/0056877 A1 | 3/2004 | Nakajima |
| 2004/0100448 A1 | 5/2004 | Moshrefzadeh |
| 2004/0199232 A1 | 10/2004 | Wallace et al. |
| 2004/0212599 A1* | 10/2004 | Cok ........ G06F 3/045 |
| | | 345/173 |
| 2005/0012723 A1 | 1/2005 | Pallakoff |
| 2005/0088417 A1 | 4/2005 | Mulligan |

(56) References Cited

U.S. PATENT DOCUMENTS

| | | |
|---|---|---|
| 2005/0157893 A1 | 7/2005 | Pelrine et al. |
| 2006/0007078 A1 | 1/2006 | Lee et al. |
| 2006/0022955 A1 | 2/2006 | Kennedy |
| 2006/0092344 A1 | 5/2006 | Ura et al. |
| 2006/0096392 A1 | 5/2006 | Inkster et al. |
| 2006/0103634 A1 | 5/2006 | Kim et al. |
| 2006/0186802 A1 | 8/2006 | Cok et al. |
| 2006/0197752 A1 | 9/2006 | Hurst et al. |
| 2006/0197753 A1 | 9/2006 | Hotelling |
| 2006/0209083 A1 | 9/2006 | Rosenberg |
| 2006/0221016 A1 | 10/2006 | Nakamura |
| 2007/0020589 A1 | 1/2007 | Smith et al. |
| 2007/0078345 A1 | 4/2007 | Mo et al. |
| 2007/0085828 A1 | 4/2007 | Schroeder et al. |
| 2007/0085838 A1 | 4/2007 | Ricks et al. |
| 2007/0091070 A1 | 4/2007 | Larsen et al. |
| 2007/0106949 A1 | 5/2007 | Narita et al. |
| 2007/0109276 A1 | 5/2007 | Kim et al. |
| 2007/0139391 A1 | 6/2007 | Bischoff |
| 2007/0152962 A1 | 7/2007 | Kim et al. |
| 2007/0152974 A1 | 7/2007 | Kim et al. |
| 2007/0182708 A1 | 8/2007 | Poupyrev et al. |
| 2007/0193267 A1 | 8/2007 | He |
| 2007/0200496 A1 | 8/2007 | Cok et al. |
| 2007/0220427 A1 | 9/2007 | Briancon et al. |
| 2007/0247422 A1 | 10/2007 | Vertegaal et al. |
| 2007/0247429 A1 | 10/2007 | Westerman |
| 2007/0257891 A1 | 11/2007 | Esenther et al. |
| 2008/0005703 A1 | 1/2008 | Radivojevic et al. |
| 2008/0042981 A1 | 2/2008 | Katz |
| 2008/0062088 A1 | 3/2008 | Chang et al. |
| 2008/0062148 A1 | 3/2008 | Hotelling et al. |
| 2008/0100907 A1 | 5/2008 | Lipovetskaya et al. |
| 2008/0122589 A1 | 5/2008 | Ivanov |
| 2008/0129705 A1 | 6/2008 | Kim et al. |
| 2008/0136786 A1 | 6/2008 | Lanfermann |
| 2008/0150911 A1 | 6/2008 | Harrison |
| 2008/0180399 A1 | 7/2008 | Cheng |
| 2008/0180406 A1 | 7/2008 | Han et al. |
| 2008/0211353 A1 | 9/2008 | Seeley et al. |
| 2008/0216001 A1 | 9/2008 | Ording et al. |
| 2008/0224948 A1 | 9/2008 | Alberth |
| 2008/0231610 A1 | 9/2008 | Hotelling et al. |
| 2008/0246726 A1 | 10/2008 | Gettemy |
| 2008/0259236 A1 | 10/2008 | Kwon et al. |
| 2008/0291521 A1 | 11/2008 | Kim et al. |
| 2008/0291525 A1 | 11/2008 | Kim et al. |
| 2008/0303795 A1 | 12/2008 | Lowles et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0015560 A1 | 1/2009 | Robinson et al. |
| 2009/0043195 A1 | 2/2009 | Poland |
| 2009/0043205 A1 | 2/2009 | Pelissier et al. |
| 2009/0051662 A1 | 2/2009 | Klein et al. |
| 2009/0061948 A1 | 3/2009 | Lee et al. |
| 2009/0070711 A1 | 3/2009 | Kwak |
| 2009/0102805 A1 | 4/2009 | Meijer et al. |
| 2009/0153368 A1 | 6/2009 | Hur et al. |
| 2009/0160813 A1 | 6/2009 | Takashima et al. |
| 2009/0167704 A1 | 7/2009 | Terlizzi et al. |
| 2009/0174671 A1 | 7/2009 | Tachi et al. |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0184936 A1 | 7/2009 | Algreatly |
| 2009/0189748 A1 | 7/2009 | Bergere |
| 2009/0189873 A1 | 7/2009 | Peterson et al. |
| 2009/0189878 A1 | 7/2009 | Goertz et al. |
| 2009/0195512 A1 | 8/2009 | Pettersson |
| 2009/0198132 A1 | 8/2009 | Pelissier et al. |
| 2009/0199392 A1 | 8/2009 | Singh et al. |
| 2009/0213066 A1 | 8/2009 | Hardacker et al. |
| 2009/0231271 A1 | 9/2009 | Heubel et al. |
| 2009/0237364 A1 | 9/2009 | Bloomcamp et al. |
| 2009/0256807 A1 | 10/2009 | Nurmi |
| 2009/0256857 A1 | 10/2009 | Davidson et al. |
| 2009/0262078 A1 | 10/2009 | Pizzi |
| 2009/0284480 A1 | 11/2009 | Seacat |
| 2009/0286211 A1 | 11/2009 | Eisenhardt et al. |
| 2009/0292990 A1* | 11/2009 | Park ............... G06F 3/016 |
| | | 715/702 |
| 2009/0295760 A1 | 12/2009 | Linge et al. |
| 2009/0303022 A1 | 12/2009 | Griffin et al. |
| 2009/0309851 A1 | 12/2009 | Bernstein |
| 2009/0315830 A1 | 12/2009 | Westerman |
| 2009/0315851 A1 | 12/2009 | Hotelling et al. |
| 2009/0322687 A1 | 12/2009 | Duncan et al. |
| 2009/0322695 A1* | 12/2009 | Cho ............... G06F 3/0416 |
| | | 345/173 |
| 2010/0001973 A1 | 1/2010 | Hotelling et al. |
| 2010/0007511 A1 | 1/2010 | Ina et al. |
| 2010/0007613 A1 | 1/2010 | Costa |
| 2010/0013777 A1 | 1/2010 | Baudisch et al. |
| 2010/0026656 A1 | 2/2010 | Hotelling et al. |
| 2010/0085169 A1 | 4/2010 | Poupyrev et al. |
| 2010/0115448 A1 | 5/2010 | Lysytskyy et al. |
| 2010/0128002 A1 | 5/2010 | Stacy et al. |
| 2010/0151426 A1 | 6/2010 | Tachi et al. |
| 2010/0156803 A1 | 6/2010 | Wu |
| 2010/0156818 A1 | 6/2010 | Burrough et al. |
| 2010/0160786 A1 | 6/2010 | Nordgren et al. |
| 2010/0162109 A1 | 6/2010 | Chatterjee et al. |
| 2010/0171715 A1 | 7/2010 | Peterson et al. |
| 2010/0177050 A1 | 7/2010 | Heubel et al. |
| 2010/0177055 A1 | 7/2010 | Ookawara et al. |
| 2010/0182245 A1 | 7/2010 | Edwards et al. |
| 2010/0207775 A1 | 8/2010 | Lenneman et al. |
| 2010/0207902 A1 | 8/2010 | Juan et al. |
| 2010/0225456 A1 | 9/2010 | Eldering |
| 2010/0225734 A1 | 9/2010 | Weller et al. |
| 2010/0231540 A1 | 9/2010 | Cruz-Hernandez et al. |
| 2010/0231541 A1 | 9/2010 | Cruz-Hernandez et al. |
| 2010/0234077 A1 | 9/2010 | Yoo et al. |
| 2010/0238114 A1 | 9/2010 | Vartanian et al. |
| 2010/0238116 A1 | 9/2010 | Shin |
| 2010/0238117 A1 | 9/2010 | Fitzgibbon et al. |
| 2010/0257491 A1 | 10/2010 | Geurts et al. |
| 2010/0259633 A1 | 10/2010 | Kii |
| 2010/0283731 A1 | 11/2010 | Grant et al. |
| 2010/0295820 A1 | 11/2010 | Kikin-Gil |
| 2010/0298713 A1 | 11/2010 | Robinson |
| 2011/0043485 A1 | 2/2011 | Goertz |
| 2011/0066320 A1* | 3/2011 | Bechtler ............ B60T 8/885 |
| | | 701/29.2 |
| 2011/0107958 A1 | 5/2011 | Pance et al. |
| 2011/0109588 A1 | 5/2011 | Makinen et al. |
| 2011/0175813 A1 | 7/2011 | Sarwar et al. |
| 2011/0199342 A1 | 8/2011 | Vartanian et al. |
| 2012/0231927 A1* | 9/2012 | Beechie ............ B60W 50/14 |
| | | 477/99 |
| 2012/0242592 A1* | 9/2012 | Rothkopf ........... G06F 1/1652 |
| | | 345/173 |
| 2014/0195926 A1* | 7/2014 | Hussain ............ G06F 3/0488 |
| | | 715/750 |
| 2015/0251633 A1* | 9/2015 | Flick ............... B60R 25/1004 |
| | | 340/429 |
| 2016/0214504 A1* | 7/2016 | Park ................. B60L 3/12 |
| 2017/0225619 A1* | 8/2017 | Torii ................ B60R 1/00 |
| 2018/0009319 A1* | 1/2018 | Sakuishi ............ B60L 3/08 |

FOREIGN PATENT DOCUMENTS

| | | |
|---|---|---|
| JP | 2001117721 A | 4/2001 |
| JP | 2003029898 A2 | 1/2003 |
| JP | 3739927 B2 | 1/2006 |
| JP | 3913496 B2 | 5/2007 |
| KR | 20040076415 | 9/2004 |
| KR | 20080023901 A | 3/2008 |
| TW | 594183 B | 6/2004 |
| WO | 9917929 A1 | 4/1999 |
| WO | 03003185 A1 | 1/2003 |
| WO | 07012899 A1 | 2/2007 |

(56) References Cited

FOREIGN PATENT DOCUMENTS

| WO | 07069835 A1 | 6/2007 |
|---|---|---|
| WO | 2007114699 A1 | 10/2007 |
| WO | 2008037275 A1 | 4/2008 |
| WO | 2010054014 A1 | 5/2010 |
| WO | 2010085575 A1 | 7/2010 |
| WO | 10086866 A1 | 8/2010 |

OTHER PUBLICATIONS

Asamura et al., "A Tactile Feeling Display Based on Selective Stimulation to Skin Receptors", Proceeding of the IEEE Virtual Reality Annual International Symposium, Mar. 1998, pp. 36-42, Atlanta, GA.
Hoshi et al., "Adding Tactile Reaction to Hologram", The 18th IEEE International Symposium on Robot and Human Interactive Communication, Sep. 27-Oct. 2, 2009, pp. 7-11, Toyama, Japan.
Iwamoto et al., "Finger Ring Device for Tactile Sensing and Human Machine Interface", SICE Annual Conference 2007, Kagawa University, Sep. 17-20, 2007, pp. 2132-2136, Japan.
Kim et al., "Small and Lightweight Tactile Display(SaLT) and Its Application", Third Joint Eurohaptics Conference and Symposium on Haptic Interfaces for Virtual Environment and Teleoperator Systems, pp. 69-74, Mar. 18-20, 2009, Salt Lake City, UT.
Chouvardas et al., "Tactile display applications: a state of the art survey", 2005.
Chouvardas et al., "Tactile Displays: a short overview and recent developments", 2007.
Khoudja et al., "Tactile interfaces: a state-of-the-art survey", CEA List SRSI, pp. 1-9, 2004, France.
Iwamoto et al., "Two Dimensional Stress Reproduction Using Ultrasound Tactile Display", SICE-ICASE International Joint Conference, Oct. 18-21, 2006, pp. 4818-4821, Busan, Korea.
Iwamoto et al., "Two-dimensional Scanning Tactile Display using Ultrasound Radiation Pressure", 14th Symposium on Haptic Interfaces for Virtual Environment and Teleoperator Systems, Mar. 2006, pp. 57-61.
Shinoda et al., "Touchable Holography" http://www.youtube.com/watch?v=Y-P1zZAcPuw, Siggraph2009, Posted Jul. 16, 2009, University of Tokyo.
Iwamoto, T et al., Airborne Ultrasound Tactile Display, SIGGRAPH 2008 New Tech Demos, Aug. 2008.
"Apple Introduces the Incredible Shape Shifting Device Interface," Patently Apple, Jun. 24, 2010.
"Artificial muscles get a makeover," accessed at http://www.msnbc.msn.com/id/11858650/, Mar. 16, 2006.
Zyga, L., "Researchers Design Band-Aid-Size Tactile Display," PHYSORG.com, Jun. 6, 2006.
"Electric Flex," (2001) Date Unknown, accessed at http://www.Spectrum.ieee.org/print/1579.
"Fundamental research on polymer material as artificial muscle," Apr. 1, 2008 (Abstract).
"Materials and Technologies for Artificial Muscle: A Review for the Mechatronic Muscle Project," Date Unknown.
"New Class of Composite Organic Material Could Put the Muscle in Artificial Body Parts," Sep. 19, 2002.
"New Polymers and Nanotubes Add Muscle to Prosthetic Limbs," Aug. 1999.
"PulseTouch™ technology," Date Unknown.
"Refreshable Braille Display," Date Unknown.
"Small jolts move artificial muscle," Oct. 2/9, 2002.
"Sony's Flexible OLED," accessed at http://www.youtube.com/watch?v=NcAm3KihFho, Uploaded on Jun. 27, 2007.
"Team post Braille ebook concept," bit-tech.net, Apr. 21, 2009.
"Two Dimensional Radiation Pressure Tactile Display," Aug. 8-10, 2005.
"Unusual material that contracts when heated is giving up its secrets to physicists," Nov. 18, 2004.
"W&M Professor Heads Facility Studying Piezoelectric Material," Jul. 6, 2001.
3DTV Experience—Philips WOWvx 3D Display; Date Unknown.
Amemiya et al., "Portable Haptic Feedback Display for Virtual Reality," 1999, Abstract Only.
"Artificial Muscle Material with Fast Electroactuation under Neutral pH Conditions," Abstract Only, May 21, 2004.
Bau, et al., "BubbleWrap: A Textile-Based Electromagnetic Haptic Display", CHI 2009, Apr. 4-9, 2009, Boston, Massachusetts, USA.
Davies, C., "NHK develop precise haptic-feedback touchscreen," Slashgear, May 16, 2008.
Harrison et al., "Texture Displays: A Passive Approach to Tactile Presentation," Apr. 9, 2009.
Howe, R., "The Haptic Community Web Site—Haptic Research: Tactile Display", Apr. 3, 2002.
Vijayan, J., "User interfaces: The next generation," Aug. 9, 2004.
"NC State Scientists Engineer 'Pumped-Up,' Materials," accessed Sep. 6, 2007.
Ooshita et al., "Tokyo University Realizes Light-weight, Flexible Braille Display Sheet Using Organic Transistors," Nov. 25, 2005.
"TouchEngine: A Tactile Display for Handheld Devices" Proceedings of CHI 2002, Extended Abstracts. 2002: ACM: pp. 644-645.
Poupyrev et al., "Haptic feedback for pen computing: directions and strategies," 2004, Abstract Only.
Sharifi et al., "Design and implementation of a graphic-haptic display system", Nov. 24, 2006.
Shinohara et al., "A blind person's interactions with technology," Communications of the ACM, vol. 52, No. 8, pp. 58-66, Aug. 2009.
Stone, R., "Haptic Feedback: A Potted History, From Telepresence to Virtual Reality," 2007, UK.
Hasser, "Tactile Feedback for a Force-Reflecting Haptic Display," Dec. 1995, Abstract Only.
Gizmodo, "Braille E-Reader Concept Raises Dots with E-Ink," Apr. 20, 2009.
"TPaD: Tactile Pattern Display (2007)," Mar. 27, 2007.
Wright, J., "Next for Touchscreens: Temporary Pop-Up Buttons?," Popular Mechanics, Aug. 2009.
Minsky, Margaret Diane Rezvan. "Computational haptics: the sandpaper system for synthesizing texture for a force-feedback display." PhD diss., Queen's University, 1995.
Massie, Thomas H., and J. Kenneth Salisbury. "The phantom haptic interface: A device for probing virtual objects." In Proceedings of the ASME winter annual meeting, symposium on haptic interfaces for virtual environment and teleoperator systems, vol. 55, No. 1. 1994.
Blackberry Storm User Guide, Version 4.7, 2008, 249 pages.
Blackberry SurePress Touch Screen, http://global.blackberry.com/en/devices/specifications/communication/surepress-touch-screen.html, Nov. 2008.

* cited by examiner

VEHICLE COMPUTING SYSTEM TO PROVIDE FEEDBACK

CROSS REFERENCE TO RELATED APPLICATIONS

This application is a continuation of U.S. patent application Ser. No. 12/706,205 filed Feb. 16, 2010, the contents of which is hereby incorporated by reference herein as if fully set forth.

FIELD OF INVENTION

This application is related to an apparatus and method for providing elevated, indented, or texturized sensations to an object near a display device using ultrasound or ultrasonic waves. Ultrasound may also be provided with or without sensations to an object for detecting input. Processes are provided and described involving elevated, indented, or texturized sensations to an object near a display device using ultrasound or ultrasonic waves. Processes are also provided for detecting input from an object using ultrasound.

BACKGROUND

Display devices for inputting information are commonplace in electronic devices such as mobile devices, cellular phones, personal digital assistants, smart phones, tablet personal computers (PCs), laptop computers, televisions, monitors, touchscreens, picture frames, or the like. Currently, display devices may be based on liquid crystal, plasma, light emitting, or organic light emitting technologies using ridged or flexible substrates. When a display device functions as an input device, such as a touchscreen, their applications are mostly limited to displaying and interacting with a user in two dimensions. Another limitation or problem of current display devices is the lack of texture to the user interface. As the world becomes more electronic, texture is needed for enhancing and enabling certain applications, computer processes, or commerce.

Ultrasound or ultrasonic technology has become ubiquitous in the medical imaging field. Recently, ultrasound has been proposed for virtual reality applications. However, the use of embedded or integrated ultrasound technology in display devices or computers for enhancing the user interface to multiple dimensions has been limited. Therefore, it is desirable to have display devices or computers that can provide elevated, indented, or texturized sensations to an object near a display device using embedded or integrated ultrasound technology. It is also desirable for ultrasound to be provided to an object with or without sensations for detecting input.

SUMMARY

An apparatus and method for providing elevated, indented, or texturized contactless sensations to an object at a distance from a display device using ultrasound or ultrasonic waves is disclosed. Processes are also given involving elevated, indented, or texturized sensations to an object near a display device using airborne ultrasound or ultrasonic waves. By providing elevated, indented, or texturized sensations to an object near a display device enhanced input/output functions are provided.

BRIEF DESCRIPTION OF THE DRAWINGS

A more detailed understanding may be had from the following description, given by way of example in conjunction with the accompanying drawings wherein.

DETAILED DESCRIPTION

The present invention will be described with reference to the drawing figures wherein like numerals represent like elements throughout. For the processes described below the steps recited may be performed out of sequence and substeps not explicitly described or shown may be performed. In addition, "coupled" or "operatively coupled" may mean that objects are linked between zero or more intermediate objects.

In the examples forthcoming ultrasound or ultrasonic waves are given as an example to provide elevated, indented, or texturized sensation to an object near a display device. However, one of ordinary skill would appreciate that any acoustic or radio wave that excites an afar object or sensed by the human body may be applicable for the examples and processes given in the disclosure.

In the examples forthcoming, the sensation felt by an object via an airborne ultrasound may be similar to vibration or gyration. The sensation may be varied by producing focal points of different sizes and intensities. For the case where the object is human skin, the vibration or gyration caused by an airborne ultrasound may depend on the targeted receptors in the skin. Adapting or controlling the ultrasound focal or control points for different receptors may cause different sensations for the user's skin.

Elevation or elevated sensations describe different sensations that may be caused to an object using ultrasound at a predetermined or random distance from a display or electronic device. As an example, the relative distance of the object may be by one or more millimeters to several meters, as desired.

Indenting may be a configuration where an object is given a sensation around its perimeter while giving little sensation to the inner area of the object. Indenting may also describe a configuration where a given location in space near a display device provides a substantially sensible ultrasound to an object but a point lower or closer to the display device the ultrasound is not substantially sensible. Indenting may also describe a configuration where a given location in space near a display device provides a substantially sensible ultrasound to an object but a point lower or closer to the display device an ultrasound is not substantially sensible until a predetermined point near the display device is reached.

Texturizing or texturing describes a process where an electronic device using controlled ultrasound over air may provide, simulate, or mimic friction, pulsing sensation, pulsating sensation, variable smoothness, variable thickness, coarseness, fineness, irregularity, a movement sensation, bumpiness, or rigidity that is sensed by or detectable by an object.

U.S. application Ser. No. 12/406,273 is herein incorporated by reference as if fully set forth and may be used in combination with the given examples to provide a display device that is elevated, indented, or texturized and ultrasound is used to provide a sensation to an object near the display device.

Figure 1:
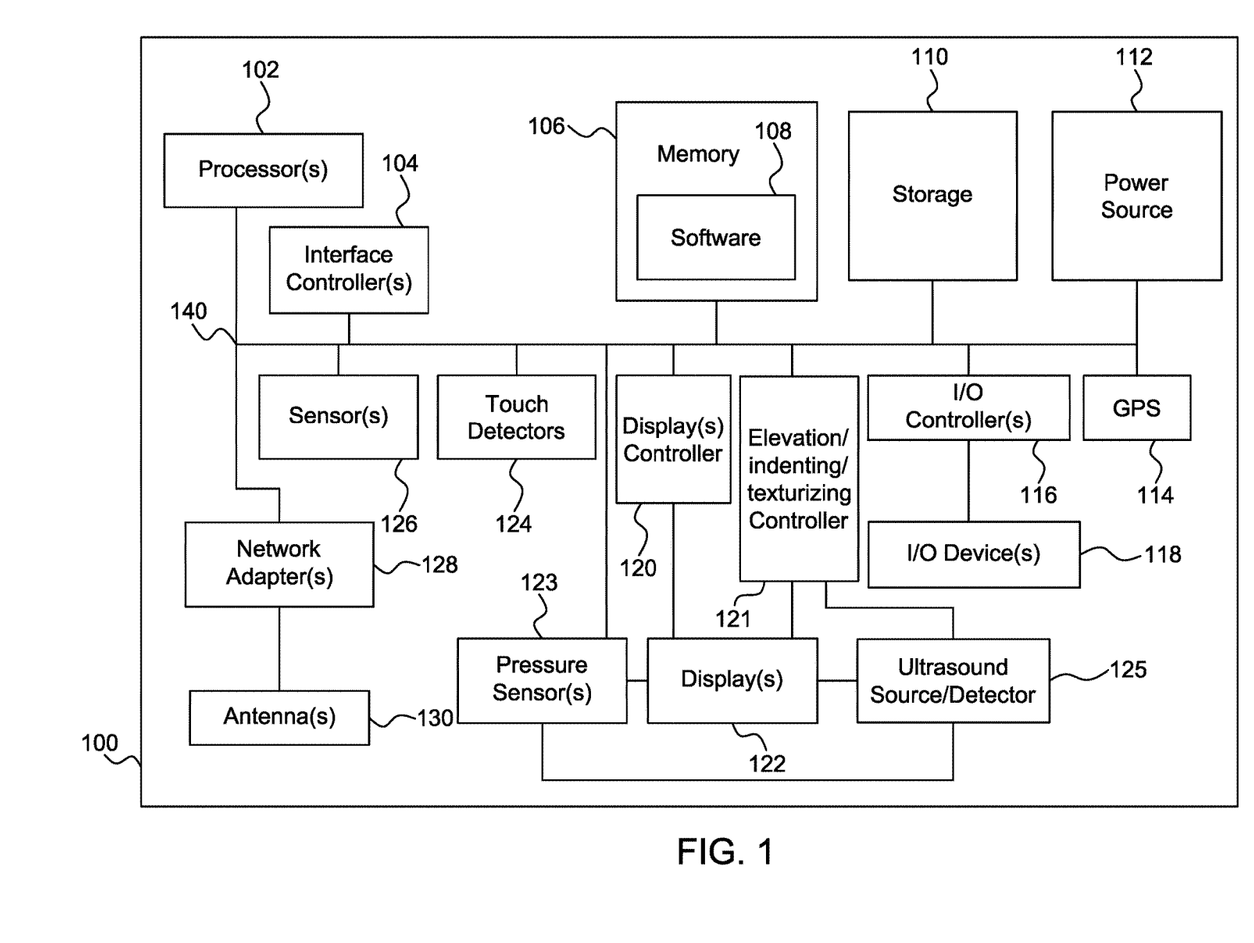
FIG. 1 is a diagram of an electronic device having a display device providing elevated, indented, or texturized sensations to an object near the display device using ultrasound in accordance with one embodiment.

FIG. 1 is a diagram of a wireless subscriber unit, user equipment (UE), mobile station, pager, cellular telephone, personal digital assistant (PDA), computing device, surface computer, tablet computer, monitor, general display, versatile device, automobile computer system, vehicle computer system, or television device 100 for mobile or fixed applications. Device 100 comprises computer bus 140 that couples one or more processors 102, one or more interface controllers 104, memory 106 having software 108, storage device 110, power source 112, and/or one or more displays controller 120. In addition, device 100 comprises an elevation, indenting, or texturizing controller 121 to provide sensations an object located near one or more display devices 122.

One or more display devices 122 can be configured as a liquid crystal display (LCD), light emitting diode (LED), field emission display (FED), organic light emitting diode (OLED), or flexible OLED display device. The one or more display devices 122 may be configured, manufactured, produced, or assembled based on the descriptions provided in US Patent Publication Nos. 2007-247422, 2007-139391, 2007-085838, or 2006-096392 or U.S. Pat. No. 7,050,835 or WO Publication 2007-012899 all herein incorporated by reference as if fully set forth. In the case of a flexible display device, the one or more electronic display devices 122 may be configured and assembled using organic light emitting diodes (OLED), liquid crystal displays using flexible substrate technology, flexible transistors, or field emission displays (FED) using flexible substrate technology, as desired. One or more display devices 122 can be configured as a touch screen display using resistive, capacitive, surface-acoustic wave (SAW) capacitive, infrared, strain gauge, optical imaging, dispersive signal technology, acoustic pulse recognition, frustrated total internal reflection or magnetostrictive technology, as understood by one of ordinary skill in the art.

Coupled to one or more display devices 122 may be pressure sensors 123. Coupled to computer bus 140 are one or more input/output (I/O) controller 116, I/O devices 118, GPS device 114, one or more network adapters 128, and/or one or more antennas 130. Device 100 may have one or more motion, proximity, light, optical, chemical, environmental, moisture, acoustic, heat, temperature, radio frequency identification (RFID), biometric, face recognition, image, photo, or voice recognition sensors 126 and touch detectors 124 for detecting any touch inputs, including multi-touch inputs, for one or more display devices 122. One or more interface controllers 104 may communicate with touch detectors 124 and I/O controller 116 for determining user inputs to device 100.

Ultrasound source/detector 125 may be configured in combination with touch detectors 124, elevation, indenting, or texturizing controller 121, one or more display devices 122, pressure sensors 123, or sensors 126 to project or generate ultrasound waves, rays, or beams to an object to simulate elevated, indented, or texturized sensations, recognize inputs, or track the object as will be explained in more detail below. There may be cases for input recognition or object tracking wherein an ultrasound is provided without detected sensation to the object.

Still referring to device 100, storage device 110 may be any disk based or solid state memory device for storing data. Power source 112 may be a plug-in, battery, solar panels for receiving and storing solar energy, or a device for receiving and storing wireless power as described in U.S. Pat. No. 7,027,311 herein incorporated by reference as if fully set forth. One or more network adapters 128 may be configured as a Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Enhanced Data rates for GSM Evolution (EDGE), General Packet Radio Service (GPRS), cdma2000, wideband CDMA (W-CDMA), long term evolution (LTE), 802.11×, Wi-Max, mobile Wi-MAX, Bluetooth, or any other wireless or wired transceiver for modulating and demodulating information communicated via one or more antennas 130. Additionally, any of devices, controllers, displays, components, etc. in device 100 may be combined, made integral, or separated as desired. For instance, elevation, indenting, or texturizing controller 121 may be combined with ultrasound source/detector 125 in one unit.

Figure 2A:
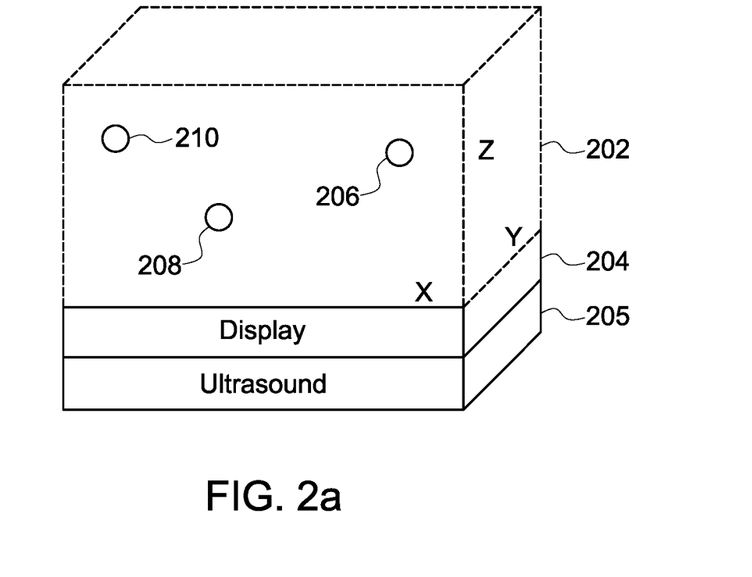
FIGS. 2a-2d and 2f are diagrams of configurations for providing elevated, indented, or texturized sensations to an object using ultrasound in accordance with another embodiment.

FIGS. 2a-2d are diagrams of configurations for providing elevated, indented, or texturized sensations to an object using ultrasound. In FIG. 2a display device layer 204 lays proximate to ultrasound layer 205. Although a single layer is shown, layers 204 and 205 can be composed of a plurality of sublayers. Although display device layer 204 is shown above that ultrasound layer 205, some or most of the components of ultrasound layer 205, such as ultrasound transducer or detectors, may be provided in substantially the same level plane as display device layer 204. Display device layer 204 can be either a flexible or rigid display device for displaying video, images, photos, graphics, text, etc.

Ultrasound layer 205 can be configured and composed of ultrasound transducer, source, or detector devices as described in "Two-dimensional scanning tactile display using ultrasound radiation pressure" by Shinoda et al. (2006), "A Tactile Display using Ultrasound Linear Phased Array" by Shinoda et al. (2004), or "Small and Lightweight Tactile Display(SaLT) and Its Application" by Kim et al. (2009) that are all herein incorporated by reference as if fully set forth. As indicated by the incorporated references, linear phased arrays of ultrasound can provide at least 1 mm diameter focal or control points for fine, precise tactile airborne stimuli at variable frequencies and intensities. Larger focal points may also be provided. Techniques for tracking or detecting motion of a focal or control point and object may include Time Delay of Arrival (TDOA) where the difference in arrival times and the velocity of an ultrasound at one or more detectors is used to establish and track location. Airborne refers to an ultrasound transmission that may propagate through the air for at least a predetermined distance.

As previously stated, stimuli can be provided to an object by transmitting one or more ultrasound focal points to cause a vibration, gyration, beat, or tap by a phased array. The ultrasound intensity may be varied to cause different feelings to the object. Varying of sensations may also be done by changing focal point sizes.

Ultrasound layer 205 comprises of an array of coupled ultrasound transducers and/or detectors that may emit directional ultrasound waves, rays, or beams through air to objects at location points 206, 208, and/or 210 in sensation zone 202. Layer 205 also detects reflections of the emitted waves off of the objects at location points 206, 208, and/or 210. Layer 205 is controlled in part by elevation, indenting, or texturizing controller 121. Sensation zone 202 may be the space, part of the space, or a force field above display device layer 204 that defines the range of ultrasound perception. Sensation zone 202 may be defined using approximate boundaries in order to limit the space ultrasound are emitted over display device layer 204 for safety or power conservation. Another benefit of having sensation zone 202 is that a user can have space in other areas of display device layer 204 for normal operation of device 100.

In addition to providing airborne ultrasound in the direction of the user, ultrasound layer 205 may be configured with transducers and detectors directed away from the user. This double-sided configuration is desirable to provide ultrasound sensations to fingers placed behind device 100 for grasping in mobile applications. Airborne ultrasound zone behind device 100 may be used to give a user the ability to virtually grasp from afar images on screen perpendicular to device 100.

Objects at location points 206, 208, and/or 210 may be any one of a finger, part of a finger, a hand, part of a hand, skin, any body part, a special ultrasound sensitive glove, part of a special ultrasound sensitive glove, an ultrasound sensitive finger attachment, an ultrasound sensitive thimble, an ultrasound sensitive wand, a material that reacts in response to ultrasound, or a material that is perceptive to ultrasound, as desired.

Figure 2B:
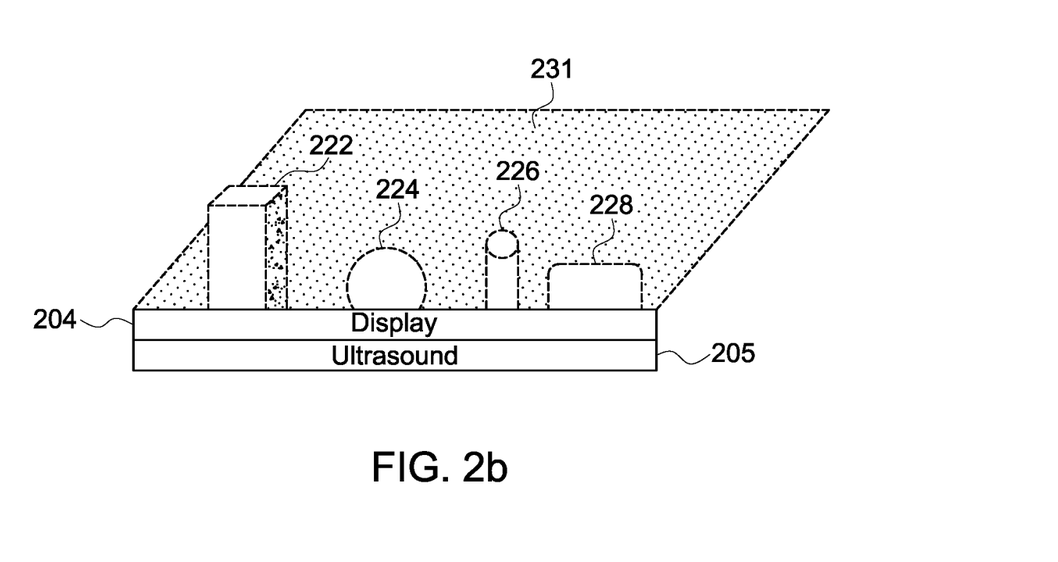

FIG. 2b is a diagram showing various approximate airborne ultrasound patterns 222, 224, 226, and 228 emitted over display device surface 231. Substantially cubicle pattern 222 may be provided by emitting rays by ultrasound layer 205 to provide a substantially cubicle sensation. FIG. 2e shows an example of a focal point pattern $222_1$ for providing a substantially cubicle pattern sensation on finger $222_2$ by ultrasound layer 205. Ultrasound control or focal points shown in FIG. 2e or other figures are not drawn to scale and may be approximate in size. Dot or dimple pattern 224 may be provided by emitting rays by ultrasound layer 205 to provide a substantially spherical sensation. FIG. 2e shows an example of a focal point pattern $224_1$ for a dot or dimple pattern on finger $224_2$ emitted by ultrasound layer 205 to provide a substantially spherical sensation.

Moreover, substantially cylindrical pattern 226 may be provided by emitting rays by ultrasound layer 205 to provide a substantially circular sensation. FIG. 2e shows an example of a focal point pattern $226_1$ for a cylindrical pattern sensation on finger $226_2$ provided by ultrasound layer 205 to provide a substantially circular sensation.

Substantially rectangular pattern 228 may be provided by emitting rays by ultrasound layer 205 to provide a substantially rectangular sensation. FIG. 2e shows an example of focal point edge patterns $228_1$ and $228_2$ for a rectangular pattern sensation on finger $228_3$ provided by ultrasound layer 205. Although two edges are shown on finger $228_3$, a single or multiple edges may be projected. Edge projections are desirable for virtual keyboard applications where the projected edges help to define the boundaries of a key.

In the examples given in FIG. 2b ultrasound layer 205 may be controlled in part by ultrasound source/detector 125 in combination with elevation, indenting, or texturizing controller 121. In FIG. 2e, the ultrasound may be swept or stroked over each focal or control point in a pattern at high frequency or variable pulsating frequencies using various intensities levels dependent upon the desired sensation or virtual effect. Although well-defined shapes are shown in the FIGS. 2b and 2e, actual sensations will vary from person to person and by the accuracy of the phased array ultrasound source.

Figure 2C:
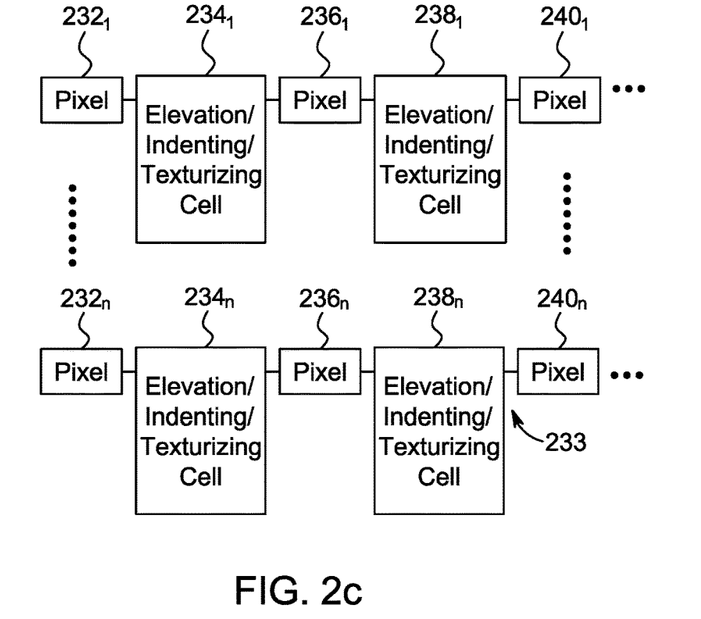

FIG. 2c is a diagram providing an example configuration of display device layer 204 and ultrasound layer 205. Display pixels $232_1$ to $232_n$ may lay partially adjacent, on the same level, or on the same layer to elevation, indenting, or texturizing cells $234_1$ to $234_n$ each having an ultrasound transducer, source, and/or detector. Alternatively, display pixels $232_1$ to $232_n$ may lay partially above elevation, indenting, or texturizing cells $234_1$ to $234_n$. Display and ultrasound array or matrix 233 also comprises of display pixels $236_1$ to $236_n$ adjacent to elevation, indenting, or texturizing cells $238_1$ to $238_n$ that are adjacent to display pixels $240_1$ to $240_n$. The elevation, indenting, or texturizing cells may be controlled by elevation, indenting, or texturizing controller 121 to adjust the intensity, orientation, or direction of the ultrasound emitted to location points 206, 208, or 210.

Figure 2D:
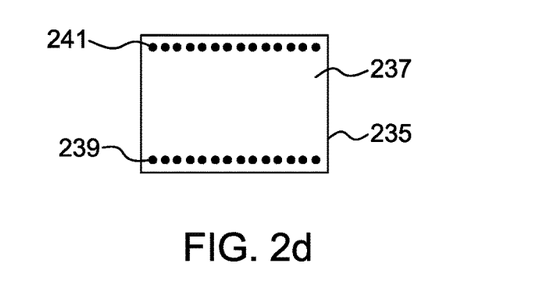
Figure 2E:
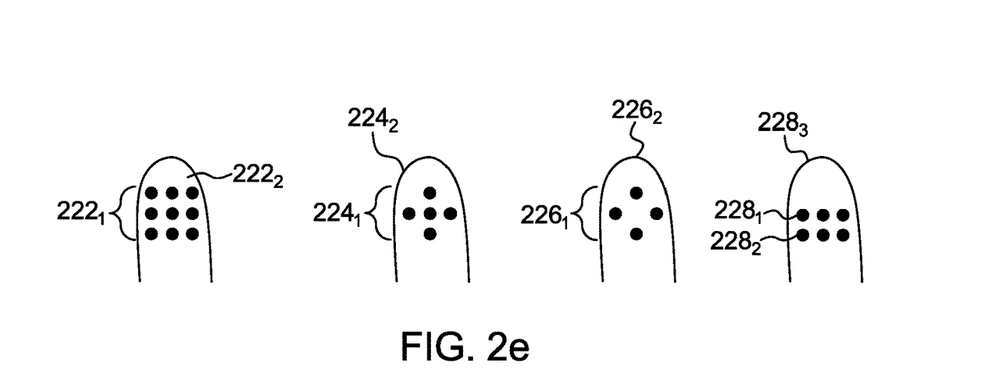
FIG. 2e is a diagram of various ultrasound focal point patterns in accordance with another embodiment.

FIG. 2d shows an embodiment of a display device array or matrix 235 from a top view where ultrasound transducer, source, or detector cells 239 and 241 are placed selectively within two predetermined areas without display pixels so that the surface of display device array or matrix 235 is mostly comprised of display pixels 237. In an alternative embodiment, cells 239 and 241 may line the perimeter of display device array or matrix 235. When around the perimeter, integration with existing display device layout may be more easily enabled.

Figure 3:
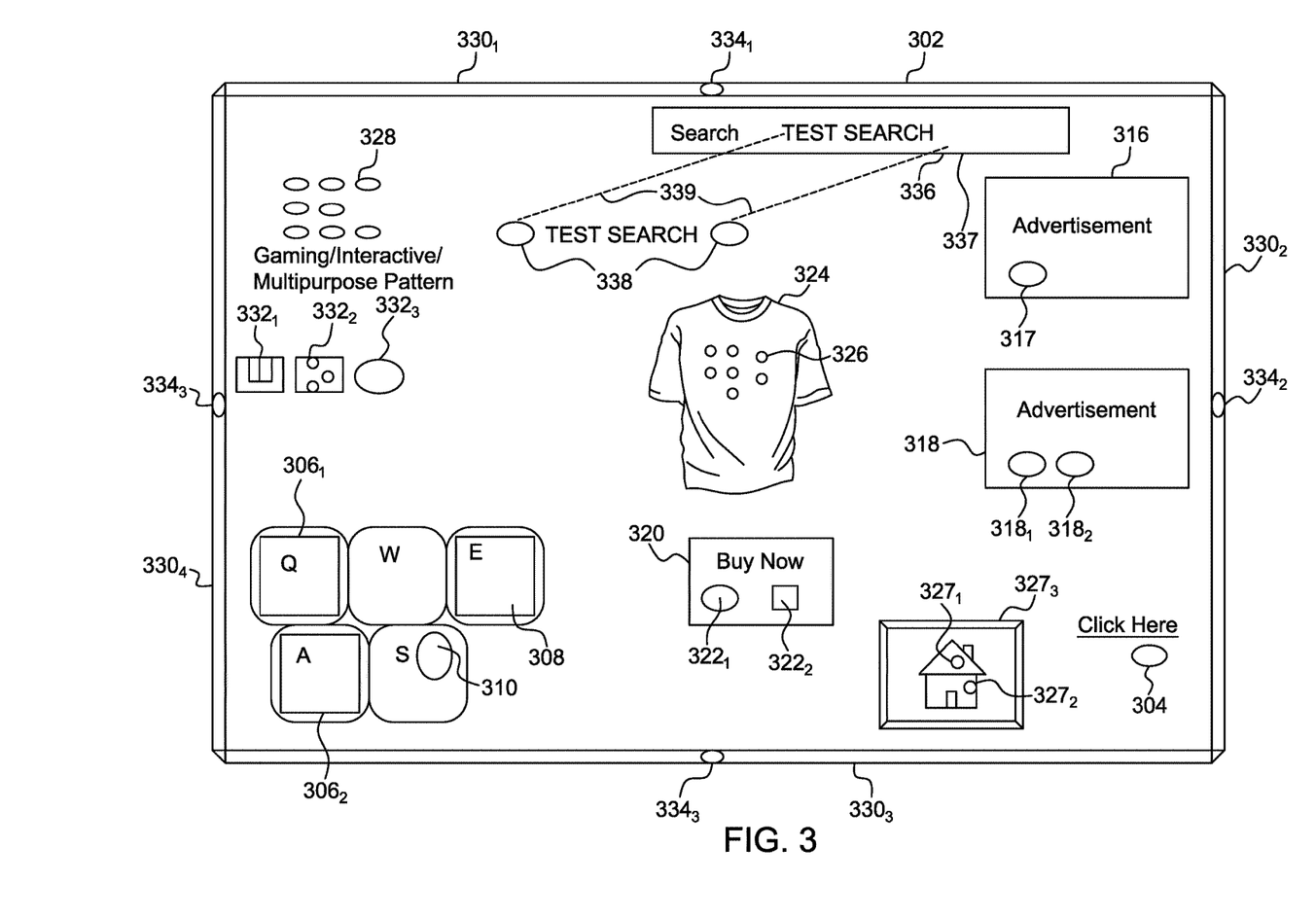
FIG. 3 is a diagram comprising of processes for an electronic device providing elevated, indented, or texturized sensations to an object near a display device using ultrasound in accordance with another embodiment.

FIG. 3 is a diagram comprising of processes for an electronic device providing elevated, indented, or texturized sensations to an object near display device 302 using ultrasound. For the examples given in FIG. 3, the object provided elevated, indented, or texturized sensations near display device 302 using ultrasound may be any one of a finger, part of a finger, multiple fingers, a hand, part of a hand, or two hands as desired. Display device 302 may be assembled with at least some of the components described in device 100.

For inputting or triggering a request action, a "click here" displayed universal resource locater (URL) or hyperlink is provided to an object that may be at location points 206, 208, and/or 210 with an elevated substantially circular ultrasound pattern 304. Clicking may be performed by tracking the motion, momentum, or velocity of the object as provided in the example in FIG. 5 below. Motion of the object relative to display device 302 that can be recognized as an input, gesture, or command may be a push towards display device 302, a pull away from display device 302, sideway or lateral motion relative to display device 302, a circle gesture, a square gesture, a rectangular gesture, a spiral gesture, a swirl gesture, a swipe gesture, a pinch gesture, a flick gesture, a customized gesture, a user defined gesture, a multiple finger coordinated motion, or a single finger gesture, as desired. In particular, single finger gesture control is desirable since the user may use for example the thumb finger for gestures to signal an input or command while holding device 100 at the same time for mobile applications allowing the other hand to be free. Gestures may be stored in a gesture library or database in storage device 110.

Figure 5:
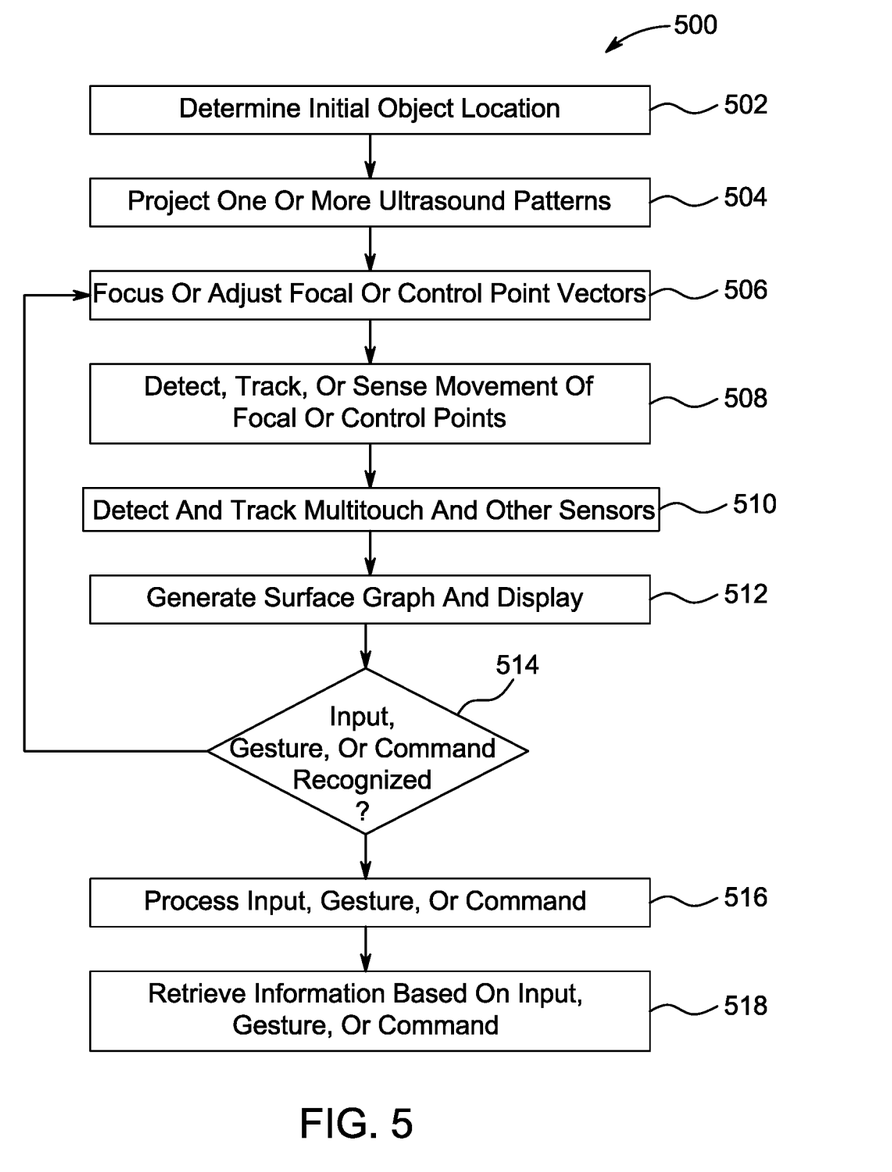
FIG. 5 is a process for providing elevated, indented, or texturized sensations to an object near a display device using ultrasound in accordance with another embodiment.

In addition to gestures, tracking an object relative to display device 302, as provided in an example in FIG. 5, may be used for drawing purposes. A user may use a finger to draw in air a character or shape that is detected by ultrasound source/detector 125 and rendered into an image by one or processors 102. This feature may be useful, for instance, in computer games, toys, or graphics applications.

In FIG. 3, part of an on screen virtual or simulated keyboard displayed on display device 302 provides the letter "E" key having an elevated substantially square ultrasound 308 provided to an object at location points 206, 208, and/or 210. Although part of a virtual or simulated keyboard is shown, display device 302 can be configured to show a whole QWERTY keyboard, a numeric keypad, or a combination of a whole QWERTY keyboard and a numeric keypad, as desired. The letter "S" key is provided by a partially displayed portion and an elevated substantially circular ultrasound 310. The virtual or simulated keyboard may also be programmed to replicate Braille lettering, as desired.

As an example, for letters "Q" and "A" ultrasound $306_1$ and $306_2$ are projected around the perimeter or edges of the keys to define boundaries so that a user may type the correct key and can find or feel the correct position of the keys. For displayed letters "Q" and "A" a user may type the key by physically touching display device 302. The touch input is detected by touch detectors 124.

In one embodiment a pull away motion of an object from display device 302 may be detectable as a capital or superscripting letter input while a push motion in the direction towards the display device may indicate subscripting of the letter. In response to a detected motion, haptic feedback, force feedback, or tactile feedback in the form of a played sound, gyration, or vibration may be provided via I/O controller 116.

Figure 4:
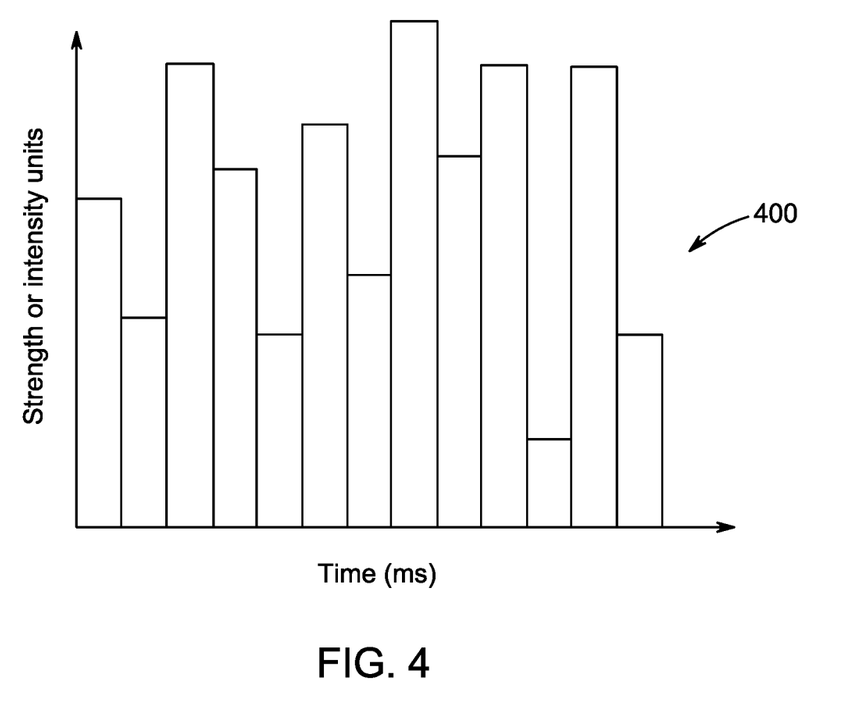
FIG. 4 is a diagram for providing varying ultrasound strengths to an object for providing elevated, indented, or texturized sensations in accordance with another embodiment.

Referring to FIG. 4, chart 400 shows an example of how ultrasound focal or control point strength or intensity units may be varied over time to provide different sensations to a user's finger, hand, or any other object. For instance, as a user pulls a finger away from display device 302, which is detected by ultrasound source/detector 125, strength or intensity units may be reduced by elevation, indenting, or texturizing controller 121. Conversely, when the finger is pushed towards display device 302 strength or intensity units may be increased for a predetermined period creating a virtual feeling of resistance.

Figure 2F:
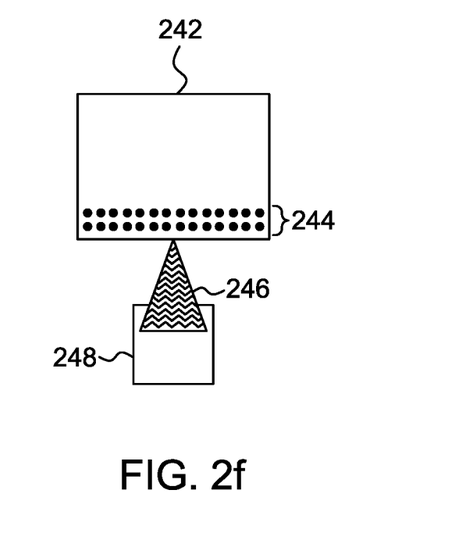

In addition to inputting information via an on screen virtual or simulated keyboard shown in FIG. 3, display device 242 may project ultrasound as shown in FIG. 2f. Ultrasound transducer, source, or detector cells 244 may project onto zone 246 so that the user's view of display device 242 is unobstructed. Zone 246 may be projected onto a table or desk giving the user the ability to use the space as an input area similar to that of a keyboard or mouse. A special pad 248 may be used to reflect or vibrate in response to ultrasound from transducer, source, or detector cells 244.

Referring again to the virtual or simulated keyboard on display device 302, instructions in software 108 can be used to predict or anticipate keystrokes. Prediction or anticipation may be based on a word or sentence entered. In response to the anticipation, a different key may emit ultrasound to a user's finger, hand, or any other object to encourage or invoke input and provide context awareness.

An embodiment of the present invention may provide enhanced electronic advertising processes. Advertisement 316, such as an adword by Google, can be sold to an advertiser for a certain price for having elevated substantially circular ultrasound 317 on at least one part or the entire advertisement image or photo. Advertisement 318 can be sold to an advertiser for a different price, higher or lower, for having elevated substantially circular ultrasound $318_1$ and $318_2$ each projected at a different intensity in comparison to substantially circular ultrasound 317. In addition, the strength or intensity of substantially circular ultrasound 317, $318_1$, and $318_2$ may be dependent on location determined by GPS device 114 and varied over time as shown in FIG. 4.

Advertisement 316 or 318 may be provided in a separate pop up window with the emitted ultrasound to an object at location points 206, 208, and/or 210. The emitted ultrasound may be provided only for a predetermined time period after the pop up window is displayed thereby providing a nudge or feeling sensation to the object. As the pop up window emerges the intensity of ultrasound to the object may be increased over time prior to turning off thereby simulating the effect of the pop up window virtually emerging from display device 302.

With advertisement 316 or 318 in a separate pop up window, or for any another application in a window, a user may interact with an operating system by moving windows, grabbing windows, dragging windows, or dropping windows. Substantially circular ultrasound 317, for instance, may provide to a user's fingers a sensation by projecting multiple focal or control points when the user virtually tries to grab a window shown on display device 302. As the user moves a window, a slight vibration is provided by substantially circular ultrasound 317. A strong vibration may be provided by substantially circular ultrasound 317 when running into obstacles or boundaries on the screen. The vibration may stop when the user releases the window, as desired.

An embodiment of the present invention may provide electronic commerce processes. A "Buy Now" button is provided with an elevated substantially circular ultrasound $322_1$ and an elevated substantially square ultrasound $322_2$ to an object at location points 206, 208, and/or 210. The "Buy Now" button is associated with triggering the purchasing of displayed shirt 324 by sending a request to a server (not shown) over one or more network adapters 128. For shirt 324, ultrasound texturizing pattern 326 is provided to virtually replicate or simulate the surface or composition of shirt 324. Ultrasound texturizing pattern 326 can be a combination of different ultrasound focal or control points. Although a shirt 324 is shown, ultrasound texturizing pattern 326 can be used to provide surface information for any product being sold or displayed on display device 302.

Using touch detectors 124 in combination with elevation, indenting, or texturizing controller 121, displayed shirt 324 can be highlighted and then rotated in response to a multi-touch input while ultrasound texturizing pattern 326 is dynamically changed to virtually reflect the different surfaces or materials used to make the shirt. Shirt 324 can be zoomed in and out using mulitouch inputs detected by touch detectors 124 with each zoom level reflecting texture differences on ultrasound texturizing pattern 326. For instance, a zoomed in view may be more grainy or rough compared to a zoomed out view. The zoom levels can also be configured with a fading in or out effect by one or more processors 102 and can involve retrieving additional information from a server (not shown) over one or more network adapters 128. Beyond the examples of fabrics, any material may be replicated or simulated by ultrasound texturizing pattern 326. Airborne ultrasound feedback, similar to multitouch inputs, may also be used to change views, angles, or size of displayed shirt 324.

Still referring to displayed shirt 324, display device 302 may be elevated, indented, or texturized in accordance with examples given in U.S. application Ser. No. 12/406,273. With shirt 324 texturized on display device 302 and at a distance to an object using ultrasound, the user is given an improved realization of the composition of the shirt by combining the two enhancements.

Referring again to FIG. 3, an embodiment of the present invention provides an electronic game, such as tic-tac-toe, by projecting ultrasound pattern 328 to an object at location points 206, 208, and/or 210. As an example given in gaming applications, ultrasound pattern 328 may be projected to multiple fingers and tracked as the user tries to pinch, grab, or push an object in a game or any other simulated environment displayed on display device 302. Ultrasound pattern 328 emitted onto an object can also control scrolling or drag and drop functions of items in a game in combination with multitouch inputs detected by touch detectors 124.

In another example, ultrasound pattern 328 can be controlled by elevation, indenting, or texturizing controller 121 such that an object being tracked at location point 206, such as user's hand, can be handed off or switched to location point 208, such as a user's other hand, to be tracked. Using this process, for instance, a user may dribble a ball from one hand to another in front of display device 302. Moreover, passing of location points in space and time from 206 to 208, results in passing a location point of an object between different horizontal planes relative to display device layer 204. Alternatively, the location point may be passed on the same plane.

In another example, ultrasound pattern 328 can be used to emulate a spring like sensation to an object and simulate elasticity to a user's hand in a game or any other application. Ultrasound layer 205 can also simulate whole screen explosions, blasts, or bullets being fired at the user by turning on several ultrasound transducers for a predetermined period of time in a game or movie. Ultrasound pattern 328 may also provide a gaming feature where tilting or rotation detected by an accelerometer in sensors 126 controls ultrasound output for four dimensional motion gaming. Ultrasound pattern 328 may also define the boundaries of a virtual space or layer between location points 206, 208, and 210 and display device layer 204.

In another embodiment, ultrasound pattern 328 projected onto multiple fingers can be used to simulate a virtual joystick or pointing stick for 360 degrees rotational input by tracking the movement of the fingers by ultrasound source/detector 125. A three dimensional accelerometer can be included in sensors 126 to be used in combination with elevation, indenting, or texturizing controller 121 to project ultrasound pattern 328 in response to a programmed action in the game. Similarly, a visual haptic ultrasound mouse or track pad may be configured by projecting and controlling ultrasound pattern 328 to replicate the functionality of a mouse or track pad and provide a 4-D free space tactile user interface device.

In another embodiment, ultrasound pattern 328 can provide enhanced features for online collaboration, distance learning, online conferencing, social networking, or online dating. For instance, in response to push command on a networked computing device (not shown), which may or may not have an ultrasound enhanced display device, ultrasound pattern 328 may provide feedback to an object at location points 206, 208, and/or 210. Examples of feedback are a poke sensation similar to that on Facebook, a push sensation, a virtual handshake sensation, etc. In online conferencing, tactile inputs or gestures via ultrasound pattern 328 may be used during a video conference application for additional interaction between conversing parties. Social networking or adult entertainment applications can be enhanced by ultrasound pattern 328 providing stimulation in connection with a video, image, photo, or audio media on display device 302.

For digital imagery, ultrasound rays $327_1$ and $327_2$ may be used to augment, enhance, or characterize different objects in photo or image $327_3$. Ultrasound rays $327_1$ and $327_2$ may be preprogrammed into photo or image $327_3$ by the owner for watermarking, artistic design, or the like. Ultrasound $327_1$ and $327_2$ may also be used to augment photo editing applications. If display device 302 is configured as a digital sign, ultrasound $327_1$ and $327_2$ may be used to get the attention of people walking near or viewing the photo or image $327_3$ on the sign.

In addition, ultrasound pattern 328 may also project sensations to simulate maps, topography, geography, imagery, or location service processes in combination with GPS device 114. Ultrasound pattern 328 can simulate mountainous regions on a map by projecting an ultrasound of various heights and intensities to an object at location points 206, 208, and/or 210.

Ultrasound pattern 328 may also be used to simulate the action of picking up (i.e. cut) or drop text (i.e. paste) in an email, 3rd Generation Partnership Project (3GPP) or 3GPP2 short message service (SMS) text message, or 3GPP/3GPP2 multimedia message service (MMS) message. Ultrasound pattern 328 may also be used in connection with a PDF document, word document, excel, four dimensional (4-D) screensaver, 4-D art, 4-D drawings, 3-D imagery, a 3-D sculpture, a 4-D "etch-a-sketch", or architecture designs using scalable or vector graphics. Any of the actions given above for ultrasound pattern 328 may be used in combination with transmitting or receiving information over one or more network adapters 128.

In e-book applications, ultrasound pattern 328 can be used to replicate or simulate the edge of a page and allow a user to virtually lift or pick-up a page. Moreover, a user may be able to feel text of varying sensations provided by ultrasound pattern 328 that is hyperlinked or highlighted on an e-book page as the user moves a finger across the page.

For multitouch applications, airborne ultrasound pattern 328 may be used to simulate friction or resistance as a user moves an image by touching the screen, zooms into an image, or zooms out of an image. When zooming beyond a threshold, ultrasound pattern 328 can be used to provide resistance thereby defining boundaries and providing a warning or alarm. While scrolling, panning, or gliding, hitting a threshold level or endpoint causes an ultrasound tactile feedback or response. For scrolling momentum, the ultrasound pattern 328 may provide high intensity initially to simulate inertia and then less intensity as momentum builds. For navigating through a list of items on display device 302, items may be highlighted on the screen as the user scrolls through the list from afar.

Moreover, display device 302 may have ultrasound source/detectors $330_1$-$330_4$ in a slightly beveled position or in the level with the frame of display device 302. Display device 302 may also have digital image or infrared cameras $334_1$-$334_4$ for tracking motion of objects at location points 206, 208, and/or 210 using algorithms such as that described in U.S. Pat. No. 7,317,872, herein incorporated by reference as if fully set forth, that can be used to perform additional sensor measurements. Other sensor measurements for additional metrics and refinement include infrared or optical detection to detect depth of objects at location points 206, 208, and/or 210. These sensors can be embedded next to or within each display cell in display device 302.

In another embodiment, display device 302 replicates, mimics, or simulates a customizable or programmable interface or control panel for a remote control, instrument panel on a vehicle, an automobile dashboard configuration, audio equalizers, multitouch equalizers, radio button list, or a consumer electronics button surface with ultrasound patterns $332_1$-$332_3$. For demoing consumer electronics online, ultrasound patterns $332_1$-$332_3$ provide a user the ability to simulate buttons on a device prior to purchase or use as a tutorial. Moreover, $332_1$-$332_3$ can be programmed for controlling volume control, replicating smart home switches or controllers, or replicating a dial or knob, as desired.

Still referring to FIG. 3, ultrasound may be used to feel, sense, or move text, images, photos, windows or icons. For instance, web searching is performed by dragging and dropping text "TEST SEARCH" 337 into search box 336. A user may be provided substantially circular ultrasound 338 when grabbing the text "TEST SEARCH" from a distance to display device 302. The user then moves or drags the text "TEST SEARCH" from afar via path 339 over to search box 336 and releases or drops it. The user's finger movements are tracked by ultrasound source/detector 125 in combination with elevation, indenting, or texturizing controller 121. The text may be shown as moving on display device 302 as the user's fingers are tracked. Similarly a visual, photo, or image search may be performed by grabbing image of shirt 324 and dropping it in search box 336.

In another example, ultrasound pattern 328 can be used to replicate or simulate a virtual stylus, pen, or pencil allowing a user to mimic writing or drawing on display device 302 similar to a notepad. The virtual stylus, pen, or pencil may be configured without the user physically holding anything. Unlike a notepad, the writing or drawing may be done at a predetermined distance from display device 302 in sensation zone 202.

Ultrasound pattern 328 can also be used for medical applications. For instance, with lap aroscopic surgery a physician located in the surgery room or remote to the surgery room may be able to feel or sense images or photos of organs of a patient provided by an internal surgical camera and displayed on display device 302. Ultrasound pattern 328 may also be used to simulate pain of a patient to a doctor over the Internet.

In another example, ultrasound pattern 328 can be responsive to voice or visual commands or recognition detected by sensors 126. Alternatively, ultrasound pattern 328 can be a preprogrammed texturized pattern to notify the user of an incoming call, similar to a customized ringtone. Alternatively, ultrasound pattern 328 may be used for providing a warning to a driver in relation to safety feature on an automobile. Alternatively, ultrasound pattern 328 may be used for enhancing icons on a system tray with each icon having a different characteristic vibration sensation. Alternatively, device 100 may be controlled remotely, either wired or wirelessly, via a server or cloud computing platform (not shown) via one or more network adapters 128.

Moreover, ultrasound pattern 328 can be used to replicate, simulate, enhance features for biometrics, musical instruments, video clips, editing audio tracks, editing video, computer aided designs (CAD), semiconductor layouts, e-books, a children's educational product, children's productivity or educational game, a general education product, a 3-D drawing tool, distance learning, or a pop-up children's books, as desired.

FIG. 5 is a process 500 for providing elevated, indented, or texturized sensations to an object near a display device using ultrasound. In the example given here, the object may be one or more fingers or hands at location points 206, 208, and/or 210. Ultrasound source/detector 125 determines the initial object location and calculates a distance and angle relative to display device 302 (step 502) to calculate focal or control point vectors. For initialization, a user's fingers, hand, or a predetermined object may be place over a predetermined zone over display device 302. Alternatively, a user's fingers, hand, or a predetermined object may be detected by digital or infrared cameras $334_1$-$334_4$ using image or photo recognition technology. Once the location of the object is determined, device 100 may display a preprogrammed image, such as a virtual keyboard or icon, on display device 302 at the detected location.

Ultrasound source/detector 125 in combination with elevation, indenting, or texturizing controller 121 projects or emits one or more ultrasound patterns, such as the ones shown in FIG. 2e, having one or more focal or control points (step 504). In order to project a predetermined sensation, the intensity of ultrasound at one or more focal or control points may be varied. Also, in the case of multiple objects ultrasound source/detector 125 may be time multiplexed to project different ultrasound patterns to each object. Elevation, indenting or texturizing controller 121 focuses or adjusts focal or control point vectors (step 506). Ultrasound source/detector 125 in combination with elevation, indenting or texturizing controller 121 detects, tracks, or senses movement of focal or control points to determine momentum and/or velocity of an object (step 508). While the object moves and is tracked, the ultrasound patterns provided to the object may vary based on images, text, video, or the like displayed on display device 302.

In order to enhance accuracy or user experience, device 100 may detect and track multitouch inputs by other fingers and/or input detected by other sensors (step 510). An animation or video of a generated surface may be displayed on display device 302 for feedback and showing the tracking of the object (step 512). If an input, gesture, or command is recognized by ultrasound source/detector 125 in combination with elevation, indenting or texturizing controller 121 (step 514), the input, gesture, or command is processed by one or more processors 102 (step 516) and information is retrieved based on the input, gesture, or command (step 518).

Although features and elements are described above in particular combinations, each feature or element can be used alone without the other features and elements or in various combinations with or without other features and elements. The methods, processes, or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), and BluRay discs.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement hardware functions for use in a computer, wireless transmit receive unit (WTRU) or any host computer. The programmed hardware functions may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a vehicle computing system, the method comprising:
    displaying, by a flexible multi-touch display electrically coupled to a processor and having embedded in a same plane an ultrasound transducer that generates touch sensations to a user over air, a pop-up window, wherein the pop-up window provides a vibration on touch, wherein the vibration increases over time and the flexible multi-touch display detects at least two touches simultaneously;
    controlling, by a controller in communication with the ultrasound transducer, ultrasound projected over air to the user by the ultrasound transducer to produce tactile virtual resistance via substantially circular ultrasound using multiple focal points in a zone for the pop-up window when moving into obstacles or boundaries on the flexible multi-touch display, wherein an intensity of the virtual resistance is dependent on location determined by a global positioning system (GPS) device and wherein predicted finger input is detected by an ultrasound detector electrically coupled to the controller; and
    displaying, by the flexible multi-touch display, a detailed list of items to navigate by touch gesture for scrolling through the list of items, wherein hitting a threshold level or end point causes an ultrasound tactile feedback, and wherein for scrolling momentum, an ultrasound pattern provides higher intensity initially and then less intensity as momentum increases.

2. A vehicle computing system comprising:
    a flexible multi-touch display, electrically coupled to a processor, having embedded in a same plane an ultrasound transducer that generates touch sensations to a user over air, and configured to display a pop-up window, wherein the pop-up window provides a vibration on touch, wherein the vibration increases over time and the flexible multi-touch display detects at least two touches simultaneously; and
    a controller configured to control, in communication with the ultrasound transducer, ultrasound projected over air to the user by the ultrasound transducer to produce tactile virtual resistance via substantially circular ultrasound using multiple focal points in a zone for the pop-up window when moving into obstacles or boundaries on the flexible multi-touch display, wherein an intensity of the virtual resistance is dependent on location determined by a global positioning system (GPS) device and wherein predicted finger input is detected by an ultrasound detector electrically coupled to the controller,
    wherein the flexible multi-touch display is further configured to display a detailed list of items to navigate by touch gesture for scrolling through the list of items, wherein hitting a threshold level or end point causes an ultrasound tactile feedback, and wherein for scrolling momentum, an ultrasound pattern provides higher intensity initially and then less intensity as momentum increases.

* * * * *